(12) United States Patent
Saito

(10) Patent No.: US 7,957,124 B1
(45) Date of Patent: Jun. 7, 2011

(54) ELECTRONIC DEVICE

(75) Inventor: Ryo Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/791,649

(22) Filed: Jun. 1, 2010

(30) Foreign Application Priority Data

Nov. 30, 2009 (JP) ................................. 2009-272696

(51) Int. Cl.
*H05K 5/00* (2006.01)
*H05K 7/00* (2006.01)
*H02B 1/00* (2006.01)
*H02B 5/00* (2006.01)
*H02B 1/26* (2006.01)

(52) U.S. Cl. .................... 361/679.01; 361/601; 361/622

(58) Field of Classification Search ............. 361/679.01, 361/601, 602, 622, 679.33; 363/152, 170
See application file for complete search history.

(56) References Cited

U.S. PATENT DOCUMENTS

| | | | | |
|---|---|---|---|---|
| 2002/0080572 | A1* | 6/2002 | McKnight | 361/685 |
| 2008/0084657 | A1* | 4/2008 | Baba et al. | 361/681 |

FOREIGN PATENT DOCUMENTS

| | | |
|---|---|---|
| JP | 05-036260 A | 2/1993 |
| JP | 09-128110 A | 5/1997 |
| JP | 11-143600 | 5/1999 |
| JP | 11-143600 A | 5/1999 |
| JP | 2001-352698 A | 12/2001 |
| JP | 2003-196964 A | 7/2003 |
| JP | 2004-350465 | 12/2004 |
| JP | 2004-350465 A | 12/2004 |
| JP | 2006-024316 A | 1/2006 |
| JP | 2006-024318 A | 1/2006 |
| JP | 2006-141170 | 6/2006 |
| JP | 2006-141170 A | 6/2006 |
| JP | 2006-190215 A | 7/2006 |
| JP | 2006-236497 A | 9/2006 |
| JP | 2007-150974 A | 6/2007 |

OTHER PUBLICATIONS

Information Sheet for preparing an Information Disclosure Statement under Rule 1.56, Jun. 2006.
Notice of Reasons for Rejection mailed by Japan Patent Office on Jul. 6, 2010 in the corresponding Japanese patent application No. 2009-272696.

* cited by examiner

*Primary Examiner* — Jayprakash N Gandhi
*Assistant Examiner* — Anthony M Haughton
(74) *Attorney, Agent, or Firm* — Knobbe, Martens, Olson & Bear LLP

(57) ABSTRACT

According to one embodiment, a note PC has a disk drive connected to a system board via a connector. A power receive coil is attached to the disk drive. Power produced by the power receive coil as a result of excitation of a power feed coil is fed to a power supply control circuit via an unused pin of the connector.

9 Claims, 3 Drawing Sheets

Electromagnetic wave

ELECTRONIC DEVICE

CROSS-REFERENCE TO RELATED APPLICATIONS

This application is based upon and claims the benefit of priority from Japanese Patent Application No. 2009-272696, filed Nov. 30, 2009, the entire contents of which are incorporated herein by reference.

BACKGROUND

1. Field

One embodiment of the invention relates to an electronic device that can be powered by noncontact power feeding.

2. Description of the Related Art

Jpn. Pat. Appln. KOKAI Publication No. 2004-350465 discloses a charging adaptor for charging a portable telephone in a noncontact manner. When charging a portable telephone using the adaptor, the adaptor is connected to the telephone and placed on a noncontact charging pad, whereby the telephone is charged by electromagnetic induction between the coils incorporated in the adaptor and the pad.

In this case, however, a connector dedicated to connection of the adaptor to the portable telephone is necessary, and the adaptor cannot be used in common for different types of portable telephones. Also in this case, the telephone cannot be charged without the adaptor, which degrades the convenience of the adaptor, compared to the conventional chargers.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
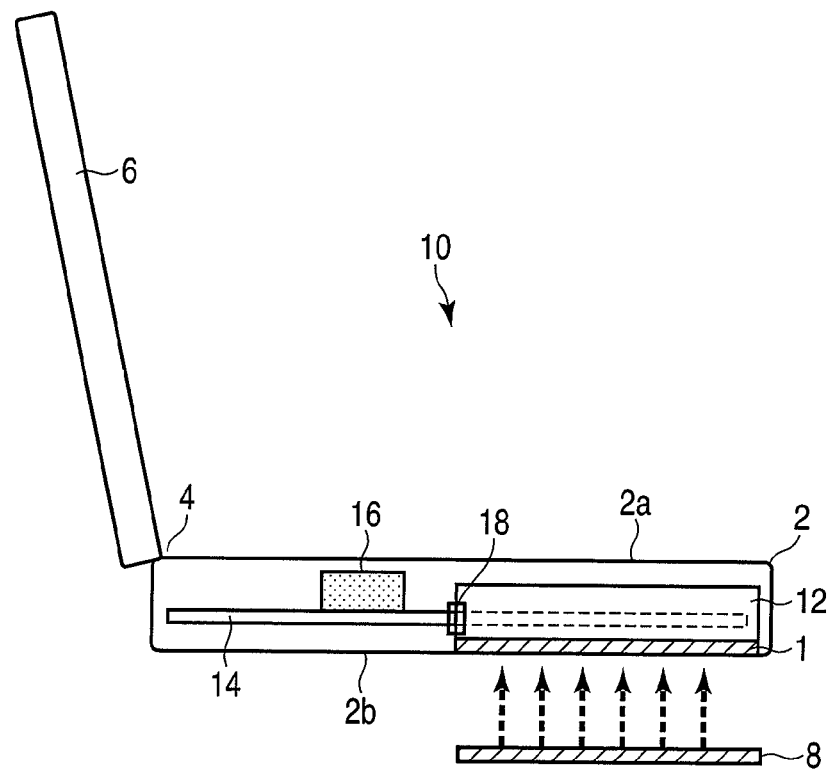
FIG. 1 is a schematic view illustrating an electronic device according to a first embodiment of the invention.

Various embodiments according to the invention will be described hereinafter with reference to the accompanying drawings. In general, according to one embodiment of the invention, a note PC 10 comprises a disk drive 12 connected to a system board 14 via a connector 18. A power receive coil 1 is adhered to the disk drive 12. The power generated by the power receive coil 1 as a result of excitation of the power feed coil 8 is supplied to a power supply control circuit 16 via an unused pin of the connector 18.

Referring to the accompanying drawings, embodiments of the invention will be described in detail.

Figure 2:
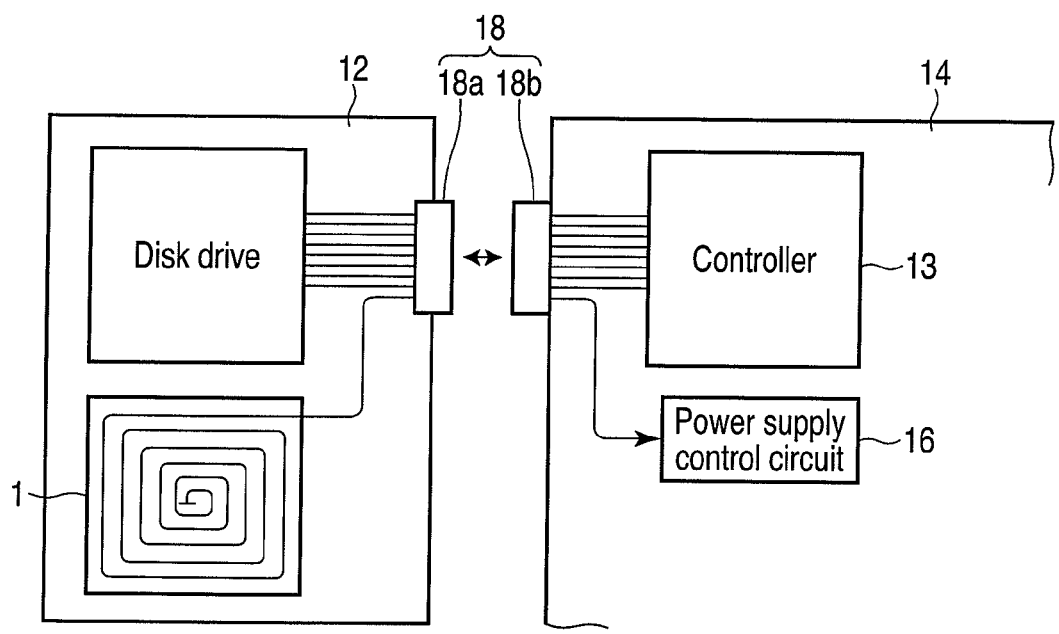
FIG. 2 is a circuit diagram useful in explaining the state of connection between the disk drive and the system board shown in FIG. 1.
Figure 3:
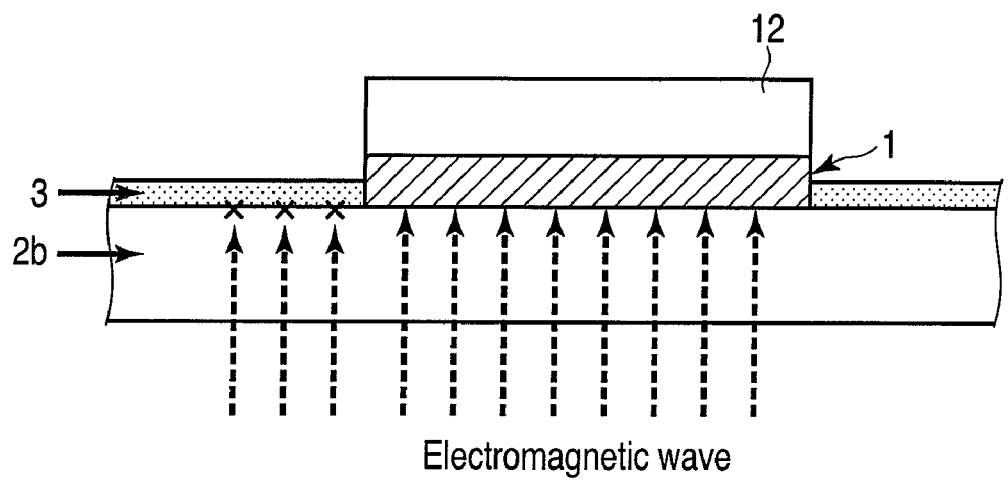
FIG. 3 is a schematic view useful in explaining conductive coating of the housing of the electronic device shown in FIG. 1.

FIG. 1 is a schematic view illustrating a note-type personal computer 10 (hereinafter referred to simply as "the note PC 10") as an electronic device according to a first embodiment of the invention. FIG. 2 is a circuit diagram useful in explaining the state of connection between a disk drive 12 and a system board 14, which are mounted in the main unit 2 of the note PC 10 as described later. FIG. 3 is a schematic view useful in explaining conductive coating 3 described later.

The note PC 10 comprises a main unit 2 provided with a keyboard or a pointing device on an upper surface 2a, and a display unit 6 connected to the rear edge of the main unit 2 via a hinge 4. The display unit 6 is rotatable between a position at which the surface 2a of the main unit 2 is open as shown in FIG. 1, and a position at which the surface 2a of the main unit 2 is closed.

A removable disk drive 12 is housed in the main unit 2 of the note PC 10. The disk drive 12 is, for example, a hard disk drive (HDD) or an optical disk drive (ODD). A slot (not shown) is formed in the housing of the main unit 2 for inserting various types of cards.

The main unit 2 also houses a system board 14. A power supply control circuit 16 is mounted on the system board 14 for converting, into system driving power or battery charging power, the power generated by noncontact power feeding via the power receive coil 1 described later. The disk drive 12 is connected to the system board 14 via the connector 18.

The connector 18 of the embodiment is, for example, an SATA connector, and is provided on the leading end of the disk drive 12 in a direction in which the disk drive is inserted. Namely, when the disk drive 12 is correctly inserted in the main unit 2, the connector 18 is connected. Note that the connector 18 has an unused terminal for feeding the system board with power generated by noncontact power feeding.

The note PC 10 of the embodiment can be powered in a noncontact manner by electromagnetic induction through the power feed coil 8 that faces the lower (reverse) surface 2b of the main unit 2. The power feed coil 8 is contained in a power feed pad (not shown), or buried in the top panel of a table (not shown) on which the note PC 10 is placed when it is used. In other words, the note PC 10 can be powered by electromagnetic induction through the power feed coil 8 when the main unit 2 is placed on the power feed pad or table with the power feed coil 8 buried therein.

More specifically, in the embodiment, the power receive coil 1 for generating power using electromagnetic induction that occurs between the coils 1 and 8 is adhered to the reverse side of the disk drive 12. Namely, when the disk drive 12 with the power receive coil 1 mounted thereon is inserted in the main unit 2, the power receive coil 1 faces the power feed coil 8 with the reverse side of the main unit 2 interposed therebetween.

In this state, if a current is passed through the power feed coil 8, the power feed coil 8 is excited to generate such a magnetic flux as indicated by the arrows of FIG. 1. The magnetic flux penetrates the power receive coil 1 that faces the excited power feed coil 8 in a noncontact manner, whereby a current caused by the electromagnetic induction flows through the power receive coil 1. The thus generated power is input to the power supply control circuit 16 via the connector 18, where it is converted into the system driving power or battery charging power.

To efficiently generate power by electromagnetic induction, it is desirable to oppose the power feed coil 8 and the power receive coil 1 with a small distance therebetween, and to interpose no conductive materials therebetween. In contrast, the housing of the main unit 2 is generally provided with conductive coating 3 (see FIG. 3) in order to prevent leakage of electromagnetic radiation. In the embodiment, only the area of the housing that faces the power receive coil 1 formed integral with the disk drive 12 as one body is provided with no conductive coating.

By virtue of this structure, any conductive material is not interposed between the power feed coil 8 and the power receive coil 1, with the result that electromagnetic induction can be produced efficiently between the coils, thereby enabling efficient noncontact power feeding.

The power receive coil 1 and the power supply control circuit 16 are connected to each other via an unused pin incorporated in the connector 18 of the disk drive 12. More specifically, as shown in FIG. 2, when the disk drive 12 is inserted into the main unit 2 and the disk-drive side connector 18a of the connector 18 is connected to the system-board side connector 18b of the connector 18 are connected to each other, the disk drive 12 is connected to a controller 13 and the power receive coil 1 is connected to the power supply control circuit 16.

As described above, in the embodiment, the power receive coil 1 formed integral with the disk drive 12 is connected to the power supply control circuit 16 on the system board 14, using the unused pin incorporated in the connector 18 of the disk drive 12. Thus, by adding a simple structure in which the power supply control circuit 16 is mounted on the system board 14, the note PC 10 can have a noncontact power feed function.

Namely, a standard note PC, which does not have a noncontact power feed function, can have this function simply by exchanging a disk drive for the disk drive 12 with the power receive coil 1 attached thereto, and exchanging a system board for the system board 14 with the power supply control circuit 16 mounted thereon.

Figure 4:
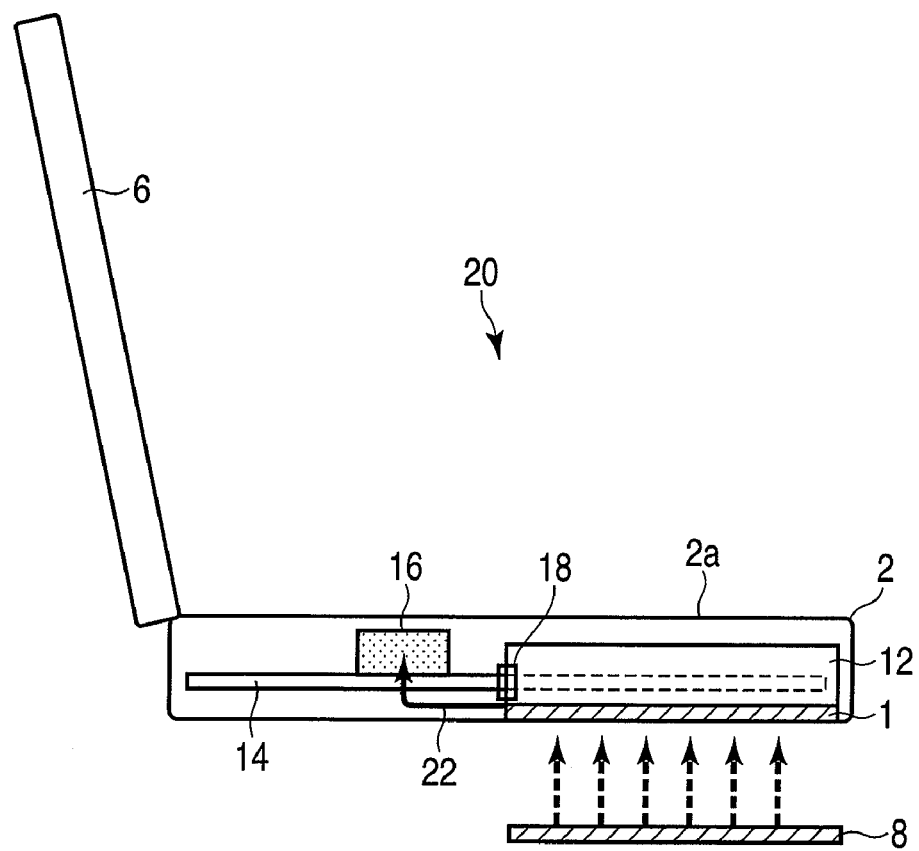
FIG. 4 is a schematic view illustrating an electronic device according to a second embodiment of the invention.

FIG. 4 is a schematic view illustrating a note PC 20 according to a second embodiment of the invention. The note PC 20 is characterized by directly connecting the power receive coil 1 to the power supply control circuit 16 via a power feed cable 22 different from the connector 18, instead of connecting the coil 1 to the system board 14 via the unused pin of the connector 18. The structure of the second embodiment other than this point is substantially the same as the first embodiment. In the description below, elements similar to those of the first embodiment are denoted by corresponding reference numbers, and no detailed description will be given thereof.

The unused pin of the connector 18 employed in the first embodiment is not dedicated to power feeding, and hence it may be difficult for the pin to exhibit a satisfactory power feed function. For instance, desired power cannot always be supplied.

In contrast, in the second embodiment in which a power feed cable 22 is used in addition to the connector 18, desired power feeding can be realized regardless of the specifications of the connector 18. In this case, only the power feed cable 22 is added, which does not make the structure of the apparatus complex.

Figure 5:
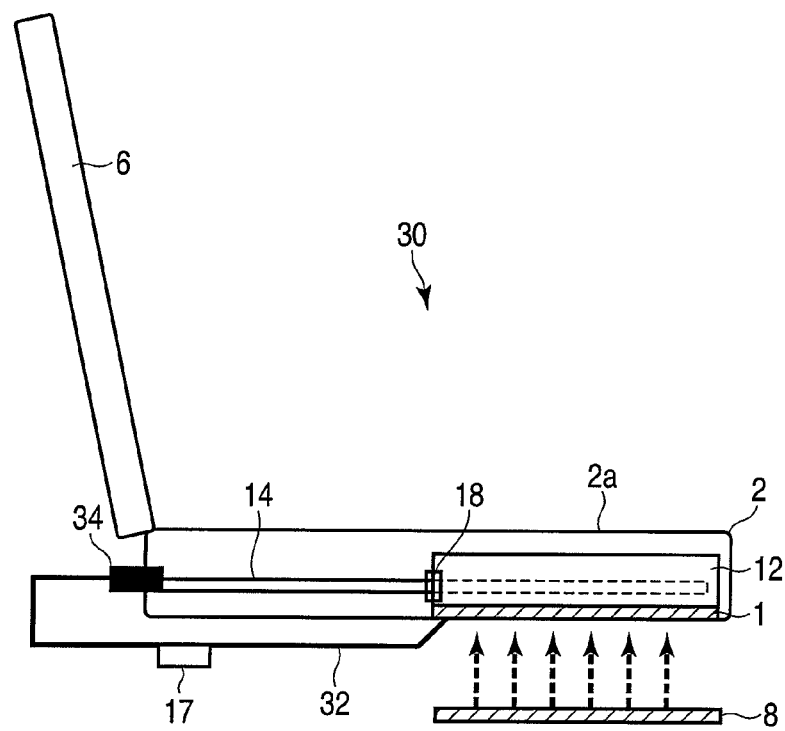
FIG. 5 is a schematic view illustrating an electronic device according to a third embodiment of the invention.

FIG. 5 is a schematic view illustrating a note PC 30 according to a third embodiment of the invention. The note PC 30 is characterized in that an external cable 32 is used instead of the power feed cable 22 of the second embodiment. In this structure, since the power generated by the power receive coil 1 is directly input to a DC connector 34 via the external cable 32, it is not necessary to mount, on the system board 14, the power supply control circuit 16 for noncontact power feeding. In this structure, although a DC conversion circuit 17 for converting, into a DC current, the power generated by the power receive coil 1, is provided across the external cable 32, the invention is not limited to this. Alternatively, the DC conversion circuit 17 may be contained in a disk drive. The structure of the third embodiment other than this point is substantially the same as the second embodiment. In the description below, elements similar to those of the second embodiment are denoted by corresponding reference numbers, and no detailed description will be given thereof.

The external cable 32 connected to the power receive coil 1 and led to the outside of the housing of the note PC 30 is externally connected to the system board 14 via the DC connector 34 provided outside the housing.

In the third embodiment, it is not necessary to mount the power supply control circuit 16 on the system board 14, unlike the first and second embodiments. Therefore, even a note PC made without considering noncontact power feeding can easily have a noncontact power feed function simply by adhering the power receive coil 1 to the disk drive 12 and connecting the external cable 32.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For instance, although in the above-described embodiments, the power receive coil 1 is adhered to the disk drive 12, the invention is not limited to this. Alternatively, the power receive coil 1 is adhered to another unit, such as a battery, which can be attached to and detached from the note PC.

Figure 6:
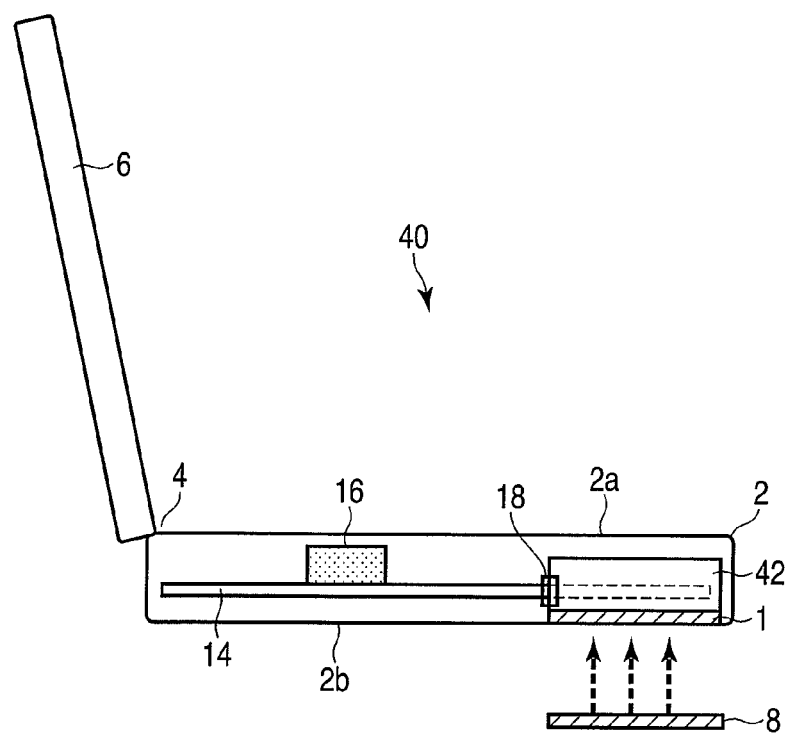
FIG. 6 is a schematic view illustrating an example in which a power receive coil is attached to a battery, not to a disk drive.

FIG. 6 is a schematic view illustrating an example in which the power receive coil 1 is attached to the reverse side of a battery 42 that can be attached to and detached from a note PC 40. Also in this example, the power receive coil 1 is attached to the system board 14 via the connector 18 of the battery 42, as in the first embodiment. Further, when the power generated via the power receive coil 1 is directly fed to the battery 42, it is not necessary to mount the power supply control circuit 16 on the system board 14.

In general, batteries can be continuously used only for several hours in a single charge. Furthermore, in general, the batteries have a life span of only several years. If the battery 42 with the power receive coil 1 of FIG. 6 attached thereto is prepared as a replacement battery, a noncontact feed function can easily be added.

In addition, the noncontact feed function may be added by adhering the power receive coil 1 to various cards attachable to and detachable from a note PC.

What is claimed is:

1. An electronic device configured to be powered by noncontact power feeding based on electromagnetic induction between the electronic device and an excited power feed coil, comprising:

a power receiver coil facing the power feed coil;

a disk drive with which the power receiver coil is integrated, the disk drive being detachably attached to the electronic device;

a power supply controller; and a connector configured to connect the power receiver coil to the power supply controller when the disk drive with which the power receiver coil is formed integral as one body is attached to the electronic device.

2. The electronic device of claim 1, wherein when the disk drive is inserted in the electronic device, an area of a housing of the electronic device apart from an area of the housing that faces the power receiver coil comprises conductive coating.

3. The electronic device of claim 1, wherein the connector is configured to connect the disk drive to the electronic device, and is configured to connect the power receiver coil to the power supply controller through a terminal of the connector when the disk drive with which the power receiver coil is integrated is attached to the electronic device.

4. An electronic device configured to be powered by non-contact power feeding based on electromagnetic induction between the electronic device and an excited power feed coil, comprising:
   a power receiver coil facing the power feed coil;
   a disk drive with which the power receiver coil is integrated, the disk drive being detachably attached to the electronic device;
   a power supply controller;
   a connector configured to connect the disk drive to the electronic device; and
   a power feed cable configured to connect the power receiver coil to the power supply controller.

5. The electronic device of claim 4, wherein when the disk drive is inserted in the electronic device, an area of a housing of the electronic device apart from an area of the housing that faces the power receiver coil comprises conductive coating.

6. An electronic device permitted to be powered by non-contact power feeding based on electromagnetic induction between the electronic device and an excited power feed coil, comprising:
   a power receiver coil facing the power feed coil;
   a disk drive with which the power receiver coil is integrated, the disk drive being detachably attached to the electronic device;
   a connector configured to connect the disk drive to the electronic device;
   an external cable configured to connect the power receiver coil to an external power supply terminal of the electronic device, and
   a DC converter provided across the external cable.

7. The electronic device of claim 6, wherein when the disk drive is inserted in the electronic device, an area of a housing of the electronic device apart from an area of the housing that faces the power receiver coil comprises conductive coating.

8. An electronic device configured to be powered by non-contact power feeding based on electromagnetic induction between the electronic device and an excited power feed coil, comprising:
   a power receiver coil facing the power feed coil;
   a battery integrated with the power receiver coil and detachably attached to the electronic device;
   a circuit board on which a power supply controller is mounted, and
   a connector configured to connect the power receiver coil to the circuit board when the battery integrated with the power receiver coil is attached to the electronic device.

9. The electronic device of claim 8, wherein conductive coating is on a housing of the electronic device apart from an area of the housing that faces the power receiver coil when the battery is attached to the electronic device.

\* \* \* \* \*